(12) United States Patent
McCormick et al.

(10) Patent No.: US 12,288,987 B2
(45) Date of Patent: Apr. 29, 2025

(54) DEMAND RESPONSE MANAGEMENT FOR A BATTERY CHARGING SYSTEM

(71) Applicant: Enatel, Christchurch (NZ)

(72) Inventors: Michael Richard McCormick, Christchurch (NZ); Callum Marcus Scott, Christchurch (NZ)

(73) Assignee: Enatel (NZ)

( * ) Notice: Subject to any disclaimer, the term of this patent is extended or adjusted under 35 U.S.C. 154(b) by 0 days.

(21) Appl. No.: 18/256,387

(22) PCT Filed: Jan. 29, 2021

(86) PCT No.: PCT/IB2021/000066
§ 371 (c)(1),
(2) Date: Jun. 7, 2023

(87) PCT Pub. No.: WO2022/162410
PCT Pub. Date: Aug. 4, 2022

(65) Prior Publication Data
US 2024/0022073 A1    Jan. 18, 2024

(51) Int. Cl.
*H02J 3/14*    (2006.01)
*B60L 53/62*    (2019.01)
(Continued)

(52) U.S. Cl.
CPC ............ *H02J 3/144* (2020.01); *B60L 53/62* (2019.02); *B60L 53/66* (2019.02);
(Continued)

(58) Field of Classification Search
CPC ...... H02J 3/144; H02J 7/00032; H02J 7/0048; H02J 13/00022; H02J 7/00712; H02J 7/0013; B60L 53/62; B60L 53/66
See application file for complete search history.

(56) References Cited

U.S. PATENT DOCUMENTS

| 2012/0019196 A1* | 1/2012 | Fung ..................... B60L 53/305 320/162 |
| 2016/0094066 A1 | 3/2016 | Charbiwala et al. |

(Continued)

FOREIGN PATENT DOCUMENTS

| JP | 2016101087 A | 5/2016 |
| JP | 2020182330 A | 11/2020 |

OTHER PUBLICATIONS

Office Action from Japanese application No. 2023-545913, dated Aug. 13, 2024, 6 pp.

(Continued)

*Primary Examiner* — Carlos Amaya
(74) *Attorney, Agent, or Firm* — Greenberg Traurig, LLP

(57) ABSTRACT

An example battery charging system utilizes demand response management to reduce energy consumption during times of high demand. The system includes a plurality of battery chargers and a charge controller in communication with the plurality of battery chargers. The charge controller may be configured to receive, from each of the plurality of battery chargers, a respective state of charge of a battery coupled to the battery charger, receive data indicative of a demand on a power source that provides power to the plurality of battery chargers, calculate a charge reduction quantity for one or more of the battery chargers according to the demand data, the states of charge of the batteries, and/or the prioritizations of batteries to meet operational needs, and transmit the charge reduction quantities to the one or more battery chargers.

19 Claims, 4 Drawing Sheets

(51) Int. Cl.
*B60L 53/66* (2019.01)
*H02J 7/00* (2006.01)
*H02J 13/00* (2006.01)

(52) U.S. Cl.
CPC ........ *H02J 7/00032* (2020.01); *H02J 7/0013* (2013.01); *H02J 7/0048* (2020.01); *H02J 7/00712* (2020.01); *H02J 13/00022* (2020.01)

(56) References Cited

U.S. PATENT DOCUMENTS

2019/0126769 A1    5/2019  Schmalzried et al.
2019/0202416 A1*  7/2019  Lai ......................... B60L 53/68

OTHER PUBLICATIONS

ISA/US, International Search Report issued on PCT application No. PCT/IB2021/000066, dated May 21, 2021, 3 pages.
ISA/US, Written Opinion issued on PCT application No. PCT/IB2021/000066, dated May 21, 2021, 10 pages.

* cited by examiner

DEMAND RESPONSE MANAGEMENT FOR A BATTERY CHARGING SYSTEM

TECHNICAL FIELD

This disclosure generally relates to management of a battery charging system, including management of charging output based on known or estimated power demand.

BACKGROUND

A battery charging system including a plurality of battery chargers, each configured to charge one or more types of batteries, may be deployed at a single site. The site may be one at which a plurality of chargeable batteries are used, or one from which a plurality of battery-powered devices, such as electric vehicles, are deployed. The site may receive electrical power from a utility provider.

SUMMARY

In a first aspect of the present disclosure, a method of operating a battery charging system is provided. The system includes a plurality of battery chargers configured to receive power from a power source. The method includes receiving, by a charge controller in communication with the plurality of battery chargers, each coupled with a respective battery, a respective state of charge of each battery, receiving, by the charge controller, data indicative of a demand on the power source, calculating, by the charge controller, a charge reduction quantity for at least one of the battery chargers according to the demand data and the states of charge of the batteries, and transmitting, by the charge controller, the charge reduction quantity to the at least one of the battery chargers.

In an embodiment of the first aspect, the data indicative of a demand on the power source is data indicative that the demand is high, and transmitting, by the charge controller, the charge reduction quantity to the at least one of the battery chargers is responsive to receiving the data indicative that the demand on the power source.

In an embodiment of the first aspect, receiving the data indicative of a demand on the power source comprises receiving a transmission from a power utility provider, the transmission comprising the data, the data being indicative of a high demand.

In an embodiment of the first aspect, receiving the data indicative of a demand on the power source comprises receiving an indication of a power usage by a site associated with the plurality of battery chargers.

In an embodiment of the first aspect, calculating a charge reduction quantity for at least one of the battery chargers according to the demand data and the states of charge of the batteries includes one or more of maximizing a quantity of fully-charged batteries, or prioritizing batteries with lowest states of charge.

In an embodiment of the first aspect, the charge controller is a second charge controller and the method further includes receiving, by the second charge controller, an indication that a first charge controller is offline, wherein the transmitting the charge reduction quantity to the at least one of the battery chargers is responsive to receiving the indication that a first charge controller is offline.

In a second aspect of the present disclosure, a battery charge controller is provided that includes a processor and a non-transitory, computer-readable memory storing instructions that, when executed by the processor, cause the battery charge controller to receive, from each of a plurality of battery chargers, a respective state of charge of a battery coupled to the battery charger, receive data indicative of a demand on a power source that provides power to the plurality of battery chargers, calculate a charge reduction quantity for at least one of the battery chargers according to the demand data and the states of charge of the batteries, and transmit the charge reduction quantity to the at least one of the battery chargers.

In an embodiment of the second aspect, the data indicative of a demand on the power source is data indicative that the demand is high, and transmitting the charge reduction quantity to the at least one of the battery chargers is responsive to receiving the data indicative of the demand on the power source.

In an embodiment of the second aspect, receiving the data indicative of a demand on the power source comprises receiving a transmission from a power utility provider, the transmission comprising the data, the data being indicative of a high demand.

In an embodiment of the second aspect, receiving the data indicative of a demand on the power source includes receiving an indication of a power usage by a site associated with the plurality of battery chargers.

In an embodiment of the second aspect, calculating a charge reduction quantity for at least one of the battery chargers according to the demand data and the states of charge of the batteries includes one or more of maximizing a quantity of fully-charged batteries, or prioritizing batteries with lowest states of charge.

In an embodiment of the second aspect, the charge controller is a second charge controller, and the memory stores further instructions that, when executed by the processor, cause the battery charge controller to receive an indication that a first charge controller is offline, wherein the transmitting the charge reduction quantity to the at least one of the battery chargers is responsive to receiving the indication that a first charge controller is offline.

In a third aspect of the present disclosure, a system is provided that includes a first battery charger and a charge controller in communication with a plurality of battery chargers, the plurality of battery chargers including the first battery charger. The charge controller may be configured to receive, from each of the plurality of battery chargers, a respective state of charge of a battery coupled to the battery charger, receive data indicative of a demand on a power source that provides power to the plurality of battery chargers, calculate a charge reduction quantity for the first battery charger according to the demand data and the states of charge of the batteries, and transmit the charge reduction quantity to the first battery charger.

In an embodiment of the third aspect, the data indicative of a demand on the power source is data indicative that the demand is high, and transmitting the charge reduction quantity to the first battery charger is responsive to receiving the data indicative of the demand on the power source.

In an embodiment of the third aspect, receiving the data indicative of a demand on the power source includes receiving a transmission from a power utility provider, the transmission comprising the data, the data being indicative of a high demand.

In an embodiment of the third aspect, receiving the data indicative of a demand on the power source includes receiving an indication of a power usage by a site associated with the plurality of battery chargers.

In an embodiment of the third aspect, calculating a charge reduction quantity for the first battery charger according to the demand data and the states of charge of the batteries includes one or more of maximizing a quantity of fully-charged batteries, or prioritizing batteries with lowest states of charge.

In an embodiment of the third aspect, the charge controller is a designated secondary charge controller, wherein the designated secondary charge controller is further configured to determine that a designated primary charge controller is offline, wherein the transmitting the charge reduction quantity to the first battery charger is responsive to determining that the designated primary charge controller is offline.

In an embodiment of the third aspect, the system further includes the plurality of battery chargers.

In an embodiment of the third aspect, the charge controller is integrated into the first battery charger

DETAILED DESCRIPTION

A battery charging system may be deployed at a site that receives power from a utility provider or other source that experiences variable demand. At times of scheduled or dynamic high demand, power delivery may have reduced quality or may cost more per unit. In addition, the infrastructure of the site itself may not support quality power delivery above a certain level of charging demand. As a result, it may be advantageous to reduce power consumption by the battery charging system during times of high demand. It may be further advantageous to selectively reduce the power consumption of the battery charging system on a coordinated charger-by-charger basis to achieve a charging goal of the charger system, such as maximizing a quantity of fully-charged batteries or maximizing a quantity of batteries with at least a minimum charge level so as to be useful.

No known solution for multi-charger battery charging systems includes coordinated charge reduction on a charger-by-charger basis that enables the charging system to achieve a particular charging goal.

Figure 1:
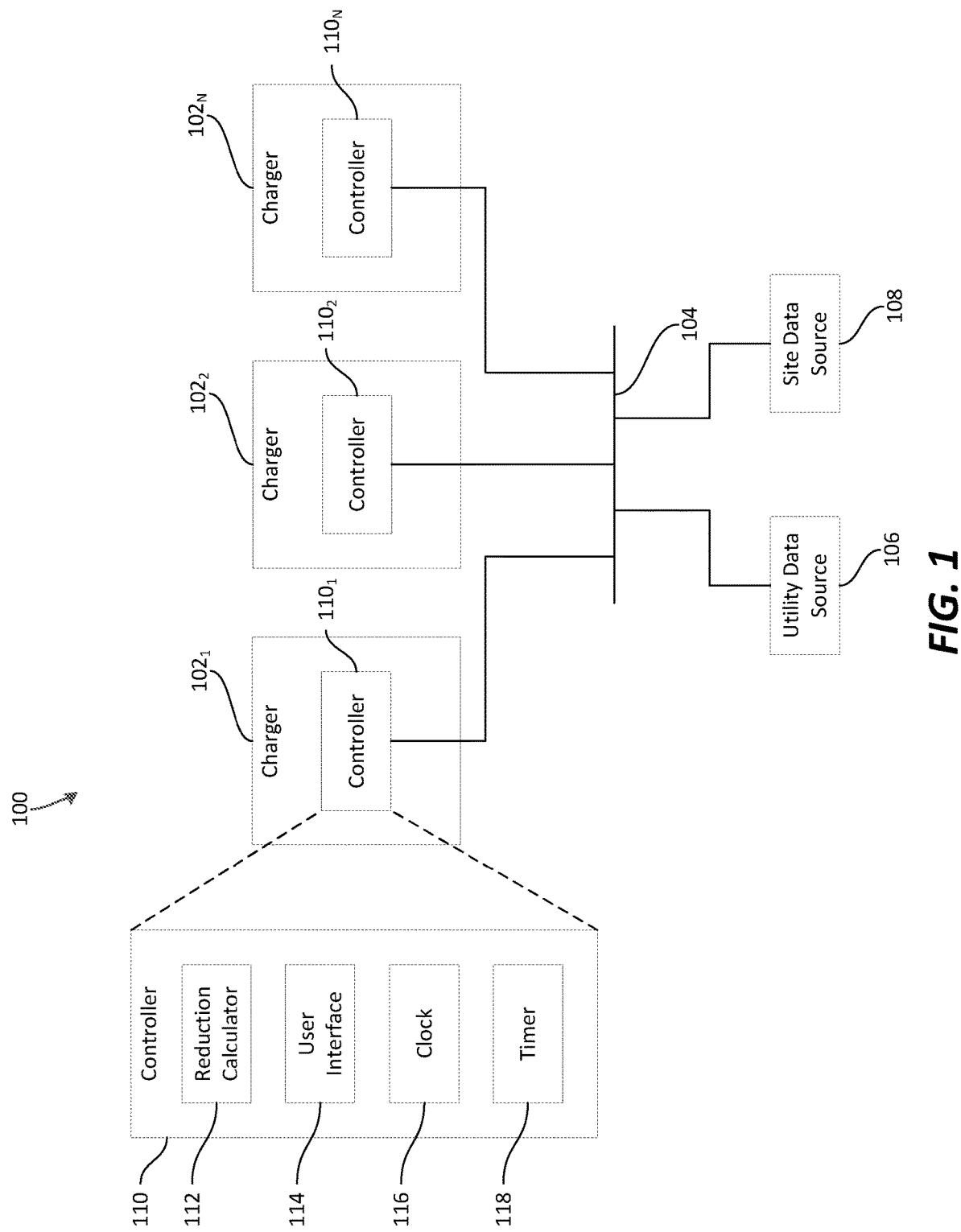
FIG. 1 is a diagrammatic view of an example battery charging system that includes demand response management.

Referring now to the drawings, wherein like numerals refer to the same or similar features in the various views, FIG. 1 is a diagrammatic view of an example battery charging system 100 that includes demand response management. The system 100 may include a plurality of battery chargers $102_1$, $102_2$, . . . $102_N$ (which may be referred to collectively as the chargers 102 or individually as a charger 102). Each battery charger 102 may be configured to charge one or more types of batteries. In some embodiments, each battery charger 102 may be a portable charger configured to be carried and transported by an individual. In some embodiments, each battery charger 102 may be configured to charge small electric vehicle batteries. Accordingly, in some embodiments, the chargers 102 may be deployed at a site for charging a fleet of electric vehicles that are used at the site or that are based at the site.

The battery chargers 102 may be in communication with one or more of the other chargers 102, such as a lead charger for a control group, which will be described below, over a data network 104. The data network 104 may include ethernet, WiFi, cellular data, and/or any other appropriate data connection. In some embodiments, the data network 104 may include one or more peer-to-peer connections between multiple chargers 102 and/or other electronic devices. Accordingly, the battery chargers 102 may transmit data to and receive data from one or more of the other chargers 102, such as a lead charger, over the data network 104.

The system 100 may further include one or more data sources 106, 108 that may provide data that may be used by one or more chargers 102 to determine an appropriate charge output (e.g., a reduction from a normal maximum charge output). The data sources 106, 108 may include, in some embodiments, a utility data source 106 and a site data source 108.

The utility data source 106 may be or may include a data connection to a utility (e.g., electricity) provider and/or a computing system of the utility provider. The utility data source 106 may provide data indicative of periods of time of relatively high demand and relatively low demand, among other data. The demand data from the utility provider data source 106 may include, for example, a per-unit cost of electricity for one or more periods of time, a quantity of anticipated or actual demand for a period of time or at a point in time, and/or some other indication of demand. The utility data source 106 may provide demand data that is broader than the site at which the chargers are deployed, in some embodiments. For example, the utility data source 106 may provide data respective of demand for a city, county, metropolitan area, etc.

The site data source 108 may be or may include a computing system deployed at the same site as the chargers 102 and may provide data regarding the electrical power usage by the site and/or portions of the site, in some embodiments. For example, the site data source 108 may provide data regarding the maximum power available to the site and/or data regarding actual and/or anticipated power consumption by the site or one or more portions of the site. Accordingly, the site data source 108 may provide an indication of high demand when the site's power consumption approaches the maximum available to the site, and/or when the site's power consumption meets some other predetermined threshold. Conversely, the site data source may provide an indication of low demand when the site's power consumption no longer approaches the maximum available to the site, and/or when the site's power consumption no longer meets another predetermined threshold.

One or more of the battery chargers $102_1$, $102_2$, . . . , $102_N$ may include a respective charge controller (which may be referred to herein simply as a "controller") $110_1$, $110_2$, . . . , $110_N$ (one of which controllers $110_1$ is shown in diagrammatic expanded form in FIG. 1) configured to determine a charge output of the charger 102 into which it is integrated or with which it is otherwise associated and one or more other chargers 102. Each controller 110 may be embodied in a processor and non-transitory, computer-readable memory storing instructions that, when executed by the processor, cause the controller 110 to perform one or more of the functions, methods, etc. disclosed herein.

In some embodiments, two or more of the battery chargers 102 may be grouped in a common control group, and the chargers 102 within a given common control group may effect a coordinated charge output strategy. For example, in an embodiment in which the chargers $102_1, 102_2, \ldots 102_N$ includes ten chargers 102, six of the ten chargers 102 may be part of a first control group, and the other four may be part of a second control group. The chargers within a group may be coordinated to reduce an overall energy requirement of the group during times of high energy demand at the site or from the electrical power utility provider supplying the site. Accordingly, a controller 110 may calculate a respective charge reduction for one or more chargers 102 in its control group.

In some embodiments, one charger 102 in a group of chargers 102 may be designated as a lead charger in the group. The controller 110 of the lead charger 102 may be configured to calculate a respective charge reduction quantity for one or more of the chargers 102 in the group and to transmit the respective charge reduction to the relevant charger 102. For example, in an embodiment is which charger $102_1$ is designated as the lead charger in a group including chargers $102_1, 102_2, 102_3$ (not shown), and $102_4$ (not shown), controller $110_1$ may calculate a respective charge reduction quantity for each of chargers $102_1, 102_2, 102_3$, and $102_4$, may cause charger $102_1$ to implement its respective charge reduction quantity, and may transmit respective charge reduction quantities to chargers $102_2$, $102_3$, and $102_4$ over the network 104. The lead charger may further be configured to transmit a periodic status signal to one or more of the chargers 102 in its control group. For example, in some embodiments, the lead charger may be configured to transmit a status signal (which may be referred to herein as a "heartbeat" signal) to a secondary charger of the control group that the lead charger is operational. The status signal may also include, in some embodiments, some or all of the state of charge data received by the primary controller from the other chargers 102 in the control group.

A charge reduction quantity may be in the form of a percentage and/or raw value relative to the input power and/or output power of the charger 102, for example. Other chargers 102 within the group may be designated as follower chargers and may be configured to receive a charge reduction quantity from the lead charger in the group and to implement that charge reduction quantity. In the example given above, chargers $102_2, 102_3$, and $102_4$ may be designated as follower chargers. In some embodiments, one of the follower chargers may also be designated a secondary controller. The controller 110 of the secondary controller may be configured to determine if the primary controller is unavailable (e.g., offline, removed from the group, etc.) and, in response, act as the primary controller.

The controller 110 may include one or more functional modules 112, 114, 116, 118 for performing the functionality described herein. The functional modules 112, 114, 116, 118 may be embodied in one or more of hardware and/or software.

The controller 110 may include a reduction calculator module 112 configured to determine when one or more charge reductions are necessary. For example, a primary controller in a control group may receive an indication that power demand is relatively high, and may determine in response that one or more charge reductions within the control group are necessary. The indication that power demand is relatively high may be received from the utility data source 106 or the site data source 108, as noted above. Additionally or alternatively, the controller 110 may receive the indication in the form of a clock module 116 of the controller 110 outputting a time at which the controller 110 is programmed to enforce a charge reduction. For example, the controller 110 may be programmed to reduce energy consumption by a certain amount at a predetermined time and, based on that predetermined amount, calculate a respective reduction for one or more chargers 102. The controller 110 may be further programmed to return to full power consumption by the chargers 102 at a given time or after a passage of a certain amount of time and to transmit an instruction to each charger at that time.

The controller 110 may further include a user interface module 114 configured to output data for a user interface, such as a graphical user interface. The user interface may be provided on a display of the charger 102, in some embodiments. Additionally or alternatively, the user interface may be provided on a computer, mobile device, or other computing device in communication with the controller 102. For example, such an interface may be in a dedicated application or may be provided on a web browser.

The controller user interface module 114 may be configured to provide one or more charge reduction trigger options to a user and may receive user selections of one or more of those triggers. The triggers may be or may include a communication from a utility provider (e.g., the utility data source 106) that energy demand is high, a communication from a site monitoring system (e.g., the site data source 108) that energy demand is high at the site, a clock-based, predetermined trigger (e.g., from the clock module 116), or some other trigger. After receiving the user input as to a particular trigger, the reduction calculation module 112 may receive that trigger, calculate responsive charger reductions for one or more chargers 102, and transmit instructions that include such charge reductions automatically (or, in the case where the reduction calculation module 112 calculates a charge reduction for its own charger 102, cause such reduction to be effected).

The user interface module 114 may be further configured to provide one or more charger designation and grouping options to a user and to receive user input regarding charger designation and grouping. For example, the user interface module 114 may receive a user designation that the charger 102 is a primary or secondary controller in a control group. The user interface module 114 may further receive user input defining a control group to which a charger 102 belongs. Accordingly, the controller 110 may receive user input that defines a control group, after which the controller 110 will issue charge reduction commands to the other chargers 102 in the group (if the charger is designated as a primary or secondary controller) and/or receive charge reduction commands from a primary or secondary controller of the group. In some embodiments, a single controller 110 may accept a user definition of a control group and may transmit group definition instructions to the remaining chargers 102 in the group. In other embodiments, a charger 102 may accept user input only as to its own group membership, such that the user inputs group membership individually for each charger 102 in the group.

A controller 110 may further include a timer module 118. A controller 110 designated as a secondary controller may utilize the timer module 118 to measure an amount of time since a most recent communication from a primary controller. For example, the designated secondary controller may receive a periodic heartbeat signal from the primary controller. When the amount of time exceeds a predetermined threshold, the controller 110 may conclude that the primary controller is unavailable, and the secondary controller may act as a primary controller for its group until the original primary controller issues a command. The secondary controller may continue to listen for a heartbeat signal even after assuming primary control. When the heartbeat from the designated primary controller is again received by the secondary controller, the secondary controller may cease acting as the primary controller.

Once a control group is defined, each charger 102 in a control group may transmit its state of charge to the primary controller in the group. In some embodiments, the primary controller may receive and re-transmit the received state of charge data to the secondary controller to enable the secondary controller to act as the primary if the designated primary controller becomes unavailable. Alternatively, each charger 102 in the control group may also transmit its state of charge to the secondary controller in the group. For example, in some embodiments, each charger 102 may transmit its state of charge periodically. In other embodiments, each charger 102 may transmit its state of charge in response to an inquiry from the primary or secondary controller. The state of charge may indicate one or more of a percentage status respective of a battery electrically coupled to the charger 102 (e.g., 10% full, 25% full, etc.), an estimated time to complete a charge of the battery or to get to a certain charge percentage, an amount of energy needed to complete a charge, or other information related to the current energy in the battery or the amount of energy needed to charge the battery.

The chargers 102 in a control group may each be configured to receive a charge reduction instruction from the lead controller in the control group and execute the received respective charge reduction. That is, a charger 102 may charge a coupled battery according to the received charge reduction instruction by charging the coupled battery at less than the full output power of the charger. In so doing, each charger may improve the ability of the control group to collectively achieve a charging goal under a high-demand condition that requires reduction of electrical consumption.

Figure 2:
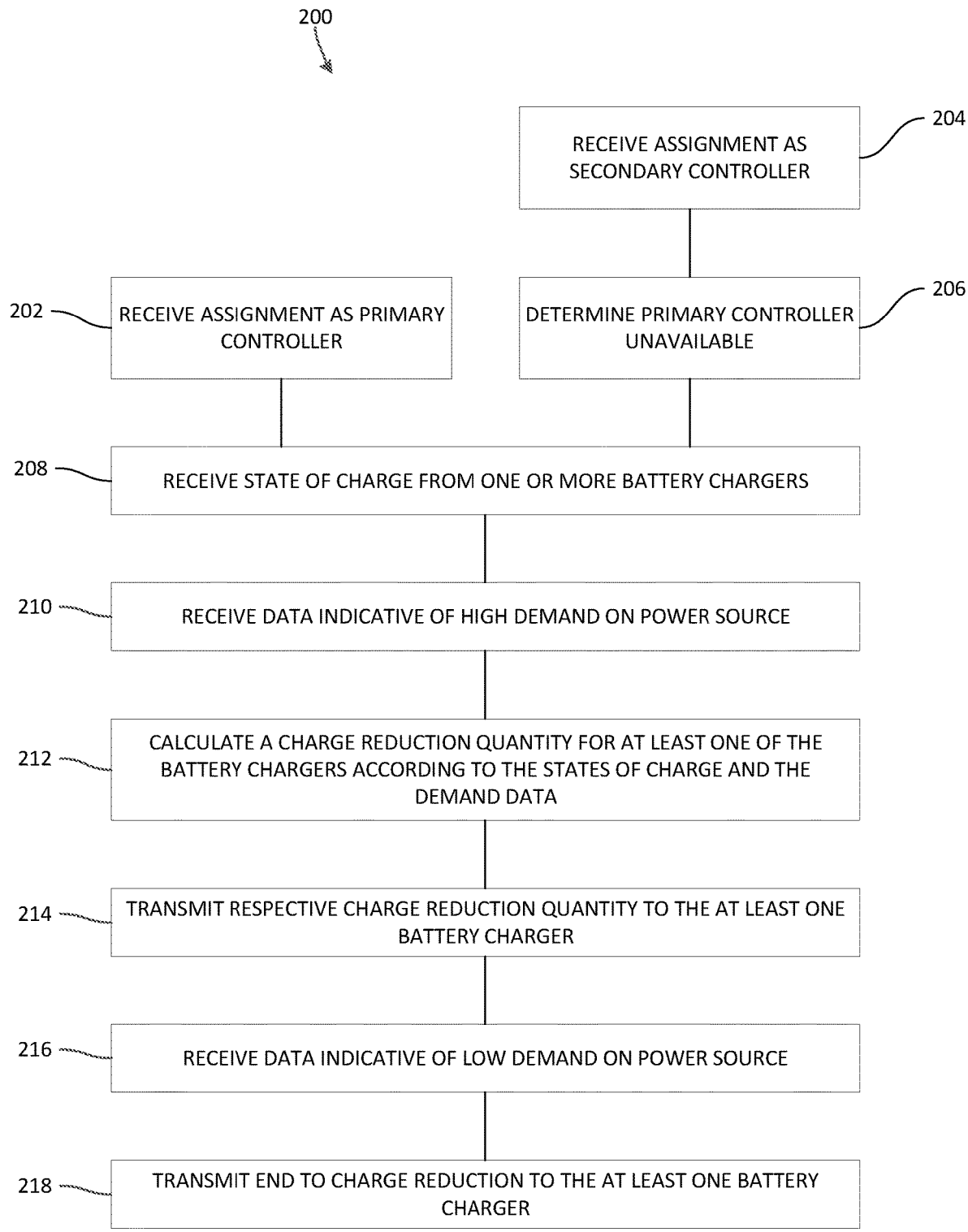
FIG. 2 is a flow chart illustrating an example method of operating a battery charging system.

FIG. 2 is a flow chart illustrating an example method 200 of operating a battery charging system. The method 200 may be performed by a controller 110 of a battery charger 102, in some embodiments.

The method 200 may include two alternative controller designation branches. In the first branch, the method 200 may include, at block 202, receiving an assignment as a primary controller. The assignment may be input by a user, in some embodiments. The user input may be directly to the controller, in some embodiments, or may be received from another controller after user input to that controller, in other embodiments.

In the second branch, the method 200 may include, at block 204, receiving an assignment as a secondary controller. The assignment may be input by a user, in some embodiments. The user input may be directly to the controller, in some embodiments, or may be received from another controller after user input to that controller, in other embodiments.

Further in the second branch, the method 200 may include, at block 206, determining that the primary controller is unavailable. The determination may include, for example, measuring a passage of time since a most recent communication from the primary controller and, in response to the passage of time exceeding a predetermined threshold, concluding that the primary controller is unavailable.

The method 200 may further include, at block 208, receiving a state of charge from one or more battery chargers. In some embodiments, block 208 may include receiving a respective state of charge from each battery charger in a control group with the controller performing the method 200.

The method 200 may further include, at block 210, receiving data indicative of a high demand on a source of power to the controller executing the method 200. The data indicative of high demand may include a transmission from a utility provider, a transmission from a site monitoring system, or a from a clock module of the controller itself. The data indicative of demand may indicate that the demand is relatively high.

The method 200 may further include, at block 212, calculating a charge reduction quantity for at least one of the battery chargers according to the states of charge received at block 208 and according to the demand data. In some embodiments, the method 300 may be deployed at block 212.

The method 200 may further include, at block 214, transmitting the respective charge reduction quantity to the relevant charger(s). Accordingly, at block 214, the controller may transmit a first charge reduction quantity to a first charger in the group, a second charge reduction quantity to a second charger in the group, and so on.

It should be noted that portions of the method 200 may be performed in an order that is different from the order illustrated in FIG. 2 and described above, in some embodiments. For example, in some embodiments, block 210 may be performed before block 208. Furthermore, one or more aspects of the method 200 may be repeated periodically. For example, a controller performing the method 200 may receive a state of charge from the chargers in its control group (block 208) periodically. Furthermore, the controller may receive data indicative of demand (block 210) periodically, and may perform blocks 212, 214 in response to either or both of an updated state of charge or an updated indication of demand.

The method 200 may further include, at block 216, receiving data indicative of a low demand on the power source. The data received at block 216 may be from the same source as the data indicative of high demand in block 210, or from another source. Accordingly, the data indicative of low demand may include a transmission from a utility provider, a transmission from a site monitoring system, or data from a clock module of the controller itself.

The method 200 may further include, at block 218, transmitting an end to the charge reduction to the at least one battery charger to which a charge reduction was transmitted at block 214. In some embodiments, block 218 may include transmitting the end to the charge reduction in response to receiving data indicative of a low demand on the power source at block 216. In some embodiments, block 218 may include transmitting an end to the charge reduction to each charger to which a nonzero charge reduction quantity was transmitted at block 214.

The charge reduction transmitted at block 214, and the end to charge reduction transmitted at block 218, may both be received and implemented by the battery chargers to which the transmissions are directed. Accordingly, as a result of the method 200, one or more chargers in a control group may implement a coordinated charge reduction strategy under the direction of a primary lead charger or a secondary lead charger that is executing the method to achieve a battery charging goal under a high demand, reduced power consumption scenario.

Figure 3:
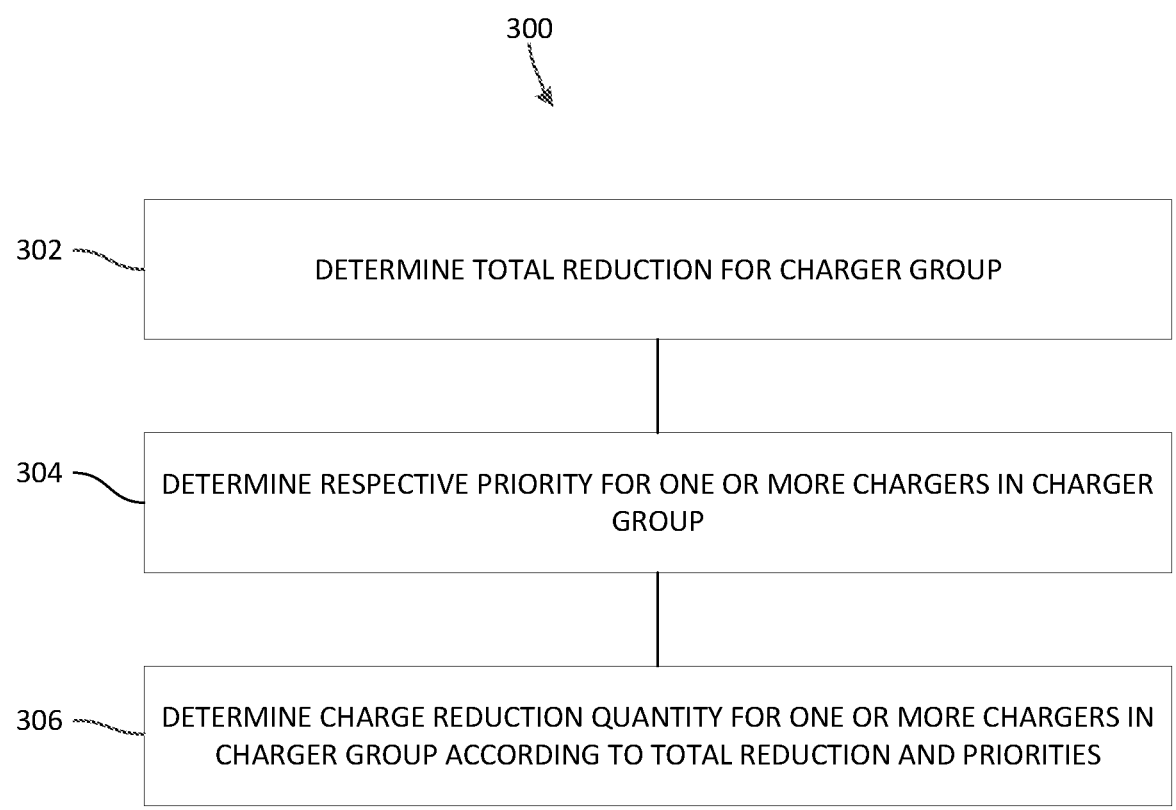
FIG. 3 is a flow chart illustrating an example method of calculating a respective charge reduction quantity for each of a plurality of battery chargers.

FIG. 3 is a flow chart illustrating an example method 300 of calculating a respective charge reduction quantity for each of a plurality of battery chargers. As noted above, the method 300 may be deployed at block 212 of the method 200 of FIG. 2.

The method 300 may include, at block 302, determining a total reduction quantity for the charger group. The total reduction may be calculated according to data included in the data indicative of a demand on the power source, such as a degree or quantity of demand, or a degree or quantity of reduction needed.

The method may further include, at block 304, determining a respective priority for one or more of the chargers in the charger group. Priorities may be determined according to a charging goal for the group and according to the states of charge of the chargers in the group, in some embodiments. For example, where a charger group goal is to maximize a quantity of fully-charged batteries, the controller may assign a high priority to chargers having a state of charge of 80% and a low priority to all other chargers in the group. In another example, where a charger group goal is to maximize a quantity of chargers of a minimum charge level to be useful (e.g., 50%), the controller may assign a high priority to each charger having a state of charge under the minimum charge level and a low priority to each charger having a state of charge over the minimum charge level. That is, in such an example, the controller, may prioritize batteries with the lowest states of charge.

The method 300 may further include, at block 306, determining a charge reduction quantity for one or more chargers in the charger group according to a total reduction quantity (e.g., the total reduction quantity calculated at block 302) and the respective priorities of the chargers in the group. For example, in some embodiments, block 306 may include calculating a nonzero charge reduction quantity for lower-priority chargers and a zero charge reduction quantity for higher-priority chargers. A respective nonzero charge reduction quantity may be calculated for each lower-priority charger so that, collectively, those charge reduction quantities are equal to or greater than the total required reduction. In some embodiments, each charge reduction quantity for a lower-priority charger may be the same as each other charge reduction quantity for each other lower-priority charger. In other embodiments, the same charge reduction quantity may be applied to each lower-priority charger.

In some embodiments, blocks 304, 306 may be repeated periodically during a period of high demand. For example, blocks 304, 306 may be performed in response to a battery being removed from a charger or a battery being inserted into a charger. In another example, blocks 304, 306 may be performed in response to a battery's state of charge meeting a charging goal, such that its priority should change. In another example, blocks 304, 306 may be performed in response to a charger being added to the group or removed from the group through user input to a user interface of a charge controller, or by the charger being removed from power or otherwise disabled.

Figure 4:
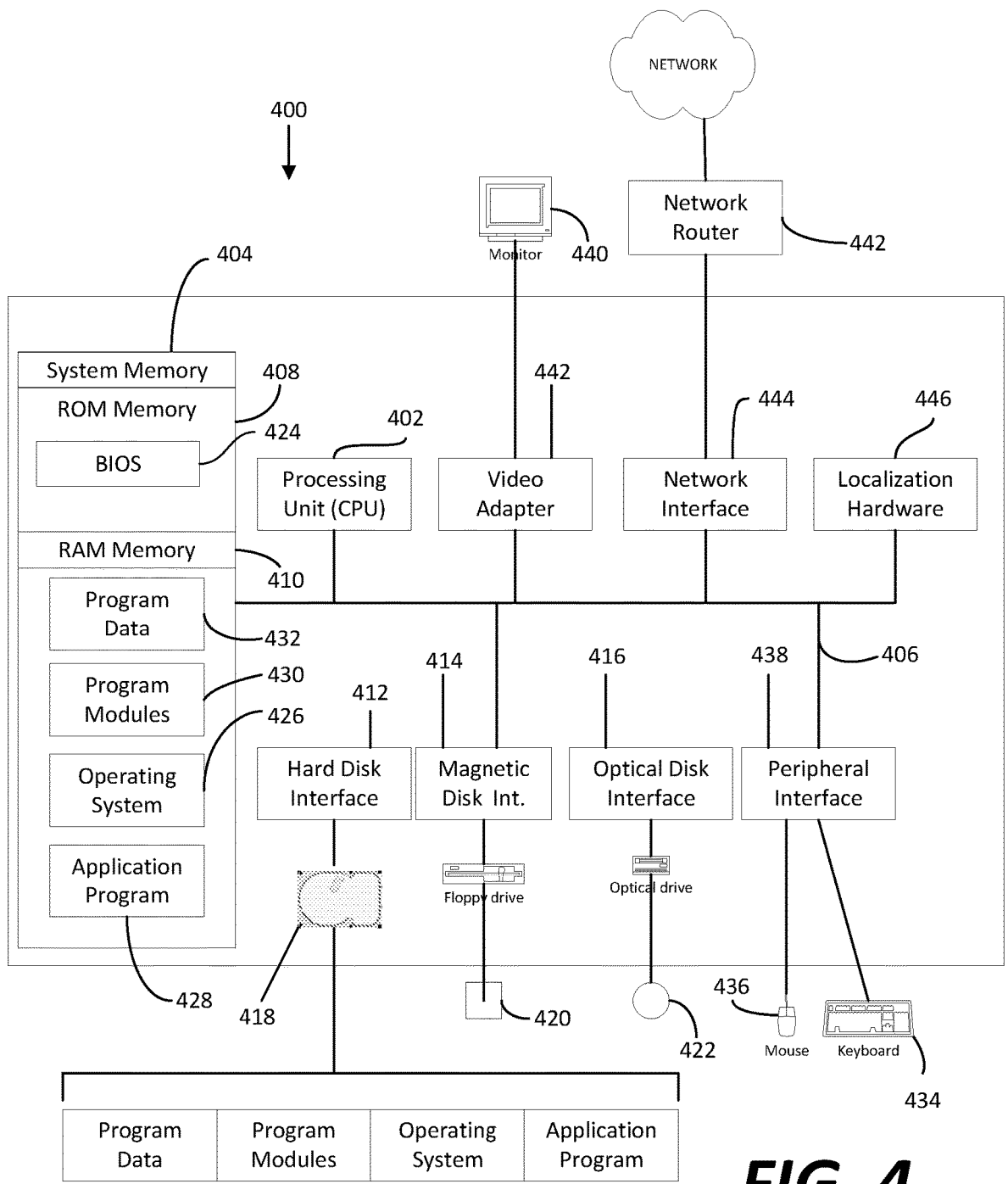
FIG. 4 is a diagrammatic view of an example embodiment of a user computing environment.

FIG. 4 is a diagrammatic view of an example embodiment of a user computing environment that includes a general purpose computing system environment 400, such as a desktop computer, laptop, smartphone, tablet, or any other such device having the ability to execute instructions, such as those stored within a non-transient, computer-readable medium. Furthermore, while described and illustrated in the context of a single computing system 400, those skilled in the art will also appreciate that the various tasks described hereinafter may be practiced in a distributed environment having multiple computing systems 400 linked via a local or wide-area network in which the executable instructions may be associated with and/or executed by one or more of multiple computing systems 400.

In its most basic configuration, computing system environment 400 typically includes at least one processing unit 402 and at least one memory 404, which may be linked via a bus 406. Depending on the exact configuration and type of computing system environment, memory 404 may be volatile (such as RAM 410), non-volatile (such as ROM 408, flash memory, etc.) or some combination of the two. Computing system environment 400 may have additional features and/or functionality. For example, computing system environment 400 may also include additional storage (removable and/or non-removable) including, but not limited to, magnetic or optical disks, tape drives and/or flash drives. Such additional memory devices may be made accessible to the computing system environment 400 by means of, for example, a hard disk drive interface 412, a magnetic disk drive interface 414, and/or an optical disk drive interface 416. As will be understood, these devices, which would be linked to the system bus 406, respectively, allow for reading from and writing to a hard disk 418, reading from or writing to a removable magnetic disk 420, and/or for reading from or writing to a removable optical disk 422, such as a CD/DVD ROM or other optical media. The drive interfaces and their associated computer-readable media allow for the nonvolatile storage of computer readable instructions, data structures, program modules and other data for the computing system environment 400. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 400.

A number of program modules may be stored in one or more of the memory/media devices. For example, a basic input/output system (BIOS) 424, containing the basic routines that help to transfer information between elements within the computing system environment 400, such as during start-up, may be stored in ROM 408. Similarly, RAM 410, hard drive 418, and/or peripheral memory devices may be used to store computer executable instructions comprising an operating system 426, one or more applications programs 428 (which may include the functionality a charge controller 110 of FIG. 1 or one or more of its functional modules 112, 114, 116, 118 for example), other program modules 430, and/or program data 432. Still further, computer-executable instructions may be downloaded to the computing environment 400 as needed, for example, via a network connection.

An end-user may enter commands and information into the computing system environment 400 through input devices such as a keyboard 434 and/or a pointing device 436. While not illustrated, other input devices may include a microphone, a joystick, a game pad, a scanner, etc. These and other input devices would typically be connected to the processing unit 402 by means of a peripheral interface 438 which, in turn, would be coupled to bus 406. Input devices may be directly or indirectly connected to processor 402 via interfaces such as, for example, a parallel port, game port, firewire, or a universal serial bus (USB). To view information from the computing system environment 400, a monitor 440 or other type of display device may also be connected to bus 406 via an interface, such as via video adapter 442.

In addition to the monitor 440, the computing system environment 400 may also include other peripheral output devices, not shown, such as speakers and printers.

The computing system environment 400 may also utilize logical connections to one or more computing system environments. Communications between the computing system environment 400 and the remote computing system environment may be exchanged via a further processing device, such a network router 442, that is responsible for network routing. Communications with the network router 442 may be performed via a network interface component 444. Thus, within such a networked environment, e.g., the Internet, World Wide Web, LAN, or other like type of wired or wireless network, it will be appreciated that program modules depicted relative to the computing system environment 400, or portions thereof, may be stored in the memory storage device(s) of the computing system environment 400.

The computing system environment 400 may also include localization hardware 446 for determining a location of the computing system environment 400. In embodiments, the localization hardware 446 may include, for example only, a GPS antenna, an RFID chip or reader, a WiFi antenna, or other computing hardware that may be used to capture or transmit signals that may be used to determine the location of the computing system environment 400.

The computing environment 400, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method of operating a battery charging system comprising a plurality of battery chargers configured to receive power from a power source, the method comprising:
   receiving, by a charge controller integrated into one of the plurality of battery chargers and in communication with the others of the plurality of battery chargers, wherein each of the plurality of battery chargers is coupled with a respective battery, a respective state of charge of each battery;
   receiving, by the charge controller, data indicative of a demand on the power source;
   calculating, by the charge controller, a charge reduction quantity for at least one of the other battery chargers according to the demand data and the states of charge of the batteries; and
   transmitting, by the charge controller, the charge reduction quantity to the at least one of the other battery chargers.

2. The method of claim 1, wherein:
   the data indicative of a demand on the power source is data indicative that the demand is high; and
   transmitting, by the charge controller, the charge reduction quantity to the at least one of the other battery chargers is responsive to receiving the data indicative of the demand on the power source.

3. The method of claim 1, wherein receiving the data indicative of a demand on the power source comprises receiving a transmission from a power utility provider, the transmission comprising the data, the data being indicative of a high demand.

4. The method of claim 1, wherein receiving the data indicative of a demand on the power source comprises receiving an indication of a power usage by a site associated with the plurality of battery chargers.

5. The method of claim 1, wherein calculating a charge reduction quantity for at least one of the other battery chargers according to the demand data and the states of charge of the batteries comprises one or more of:
   maximizing a quantity of fully-charged batteries; or
   prioritizing batteries with lowest states of charge.

6. The method of claim 1, wherein the charge controller is a second charge controller, the method further comprising:
   receiving, by the second charge controller, an indication that a first charge controller is offline;
   wherein the transmitting the charge reduction quantity to the at least one of the other battery chargers is responsive to receiving the indication that a first charge controller is offline.

7. A primary battery charger comprising a primary charge controller, the charge controller comprising:
a processor; and
a non-transitory, computer-readable memory storing instructions that, when executed by the processor, cause the battery charge controller to:
receive, from each of a plurality of secondary battery chargers, a respective state of charge of a battery coupled to the battery charger, each of the plurality of secondary battery chargers comprising secondary charge controllers that receive instructions from the primary charge controller;
receive data indicative of a demand on a power source that provides power to the plurality of battery chargers;
calculate a charge reduction quantity for the primary battery charger and at least one of the secondary battery chargers according to the demand data and the states of charge of the batteries;
cause the primary battery charger to implement the charge reduction quantity; and
transmit the charge reduction quantity to the at least one of the secondary battery chargers.

8. The primary battery charger of claim 7, wherein:
the data indicative of a demand on the power source is data indicative that the demand is high; and
transmitting the charge reduction quantity to the at least one of the battery chargers is responsive to receiving the data indicative of the demand on the power source.

9. The primary battery charger of claim 7, wherein receiving the data indicative of a demand on the power source comprises receiving a transmission from a power utility provider, the transmission comprising the data, the data being indicative of a high demand.

10. The primary battery charger of claim 7, wherein receiving the data indicative of a demand on the power source comprises receiving an indication of a power usage by a site associated with the plurality of battery chargers.

11. The primary battery charger of claim 7, wherein calculating the charge reduction quantity comprises one or more of:
maximizing a quantity of fully-charged batteries; or
prioritizing batteries with lowest states of charge.

12. The primary battery charger of claim 7, wherein the primary charge controller is a second charge controller, wherein the memory stores further instructions that, when executed by the processor, cause the primary battery charge controller to:
receive an indication that a first, previously primary charge controller is offline;
wherein the transmitting the charge reduction quantity to the at least one of the secondary battery chargers is responsive to receiving the indication that the first, previously primary charge controller is offline.

13. A system comprising:
a first battery charger; and
a charge controller integrated into the first battery charger and in communication with a plurality of secondary battery chargers, the charge controller configured to:
receive, from each of the first battery charger and the plurality of secondary battery chargers, a respective state of charge of a battery coupled to the battery charger;
receive data indicative of a demand on a power source that provides power to the plurality of battery chargers;
calculate a charge reduction quantity for one of the plurality of secondary battery chargers according to the demand data and the states of charge of the batteries; and
transmit the charge reduction quantity to the one of the plurality of secondary battery chargers.

14. The system of claim 13, wherein:
the data indicative of a demand on the power source is data indicative that the demand is high; and
transmitting the charge reduction quantity to the one of the plurality of secondary battery chargers is responsive to receiving the data indicative of the demand on the power source.

15. The system of claim 13, wherein receiving the data indicative of a demand on the power source comprises receiving a transmission from a power utility provider, the transmission comprising the data, the data being indicative of a high demand.

16. The system of claim 13, wherein receiving the data indicative of a demand on the power source comprises receiving an indication of a power usage by a site associated with the plurality of battery chargers.

17. The system of claim 13, wherein calculating the charge reduction quantity comprises one or more of:
maximizing a quantity of fully-charged batteries; or
prioritizing batteries with lowest states of charge.

18. The system of claim 13, wherein the charge controller is a designated secondary charge controller, wherein the designated secondary charge controller is further configured to:
determine that a designated primary charge controller is offline;
wherein the transmitting the charge reduction quantity is responsive to determining that the designated primary charge controller is offline.

19. The system of claim 13, further comprising the plurality of secondary battery chargers.

* * * * *